This invention relates to sigma-spot welding and more particularly to the utilization of this method for operation upon aluminum.

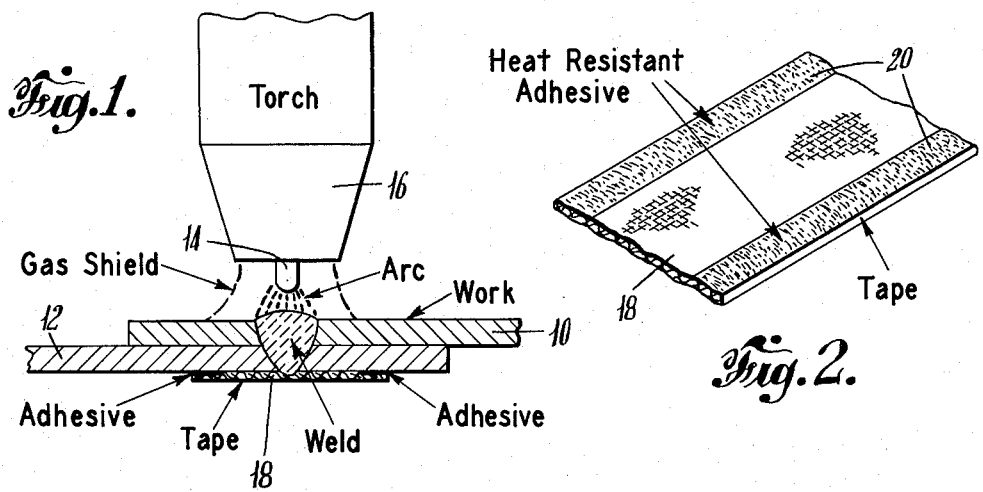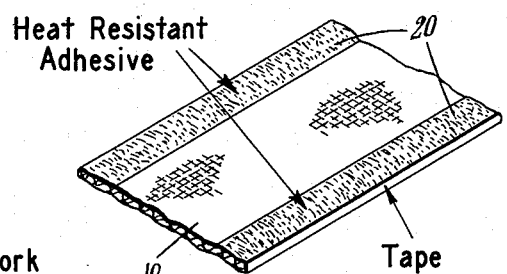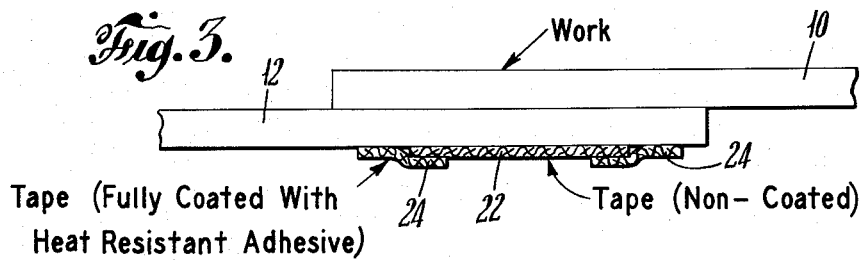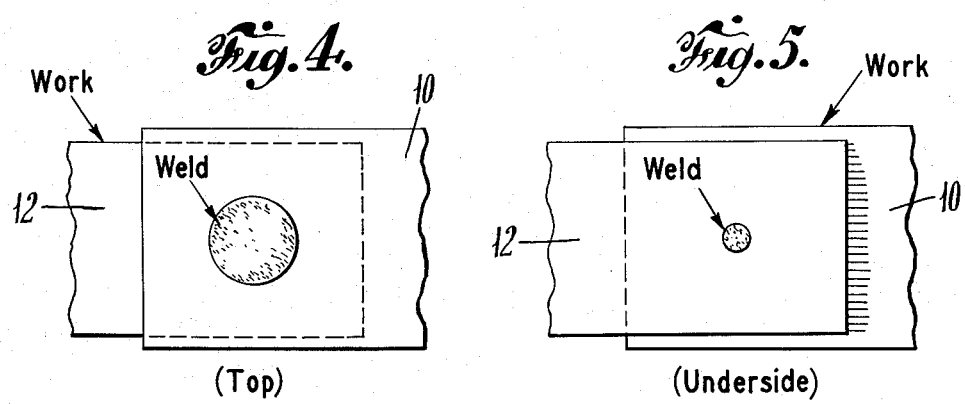
INVENTORS
ROBERT L. HACKMAN
LESTER J. O'BRIEN
BY Richard S. Shreve Jr.
ATTORNEY : 3,001,057
SIGMA SPOT WELDING
Robert L. Hackman, Morris Plains, and Lester J. O'Brien, Maplewood, N.J., assignors to Union Carbide Corporation, a corporation of New York
Filed Nov. 12, 1957, Ser. No. 695,938
2 Claims. (Cl. 219—127)

Inert-gas-shielded-metal-arc welding has not been promoted for the joining of aluminum sheet because of inconsistencies in weld strength. Even when all normal variables are controlled as closely as possible, the strengths of Sigma spot welds on aluminum sheet have been much lower than required by specifications for resistance spot welding and have varied over a wide range.

The primary reason for the difficulty in achieving strong, consistent welds is that the depth of weld penetration cannot be easily controlled. In order to achieve maximum strength, the weld should penetrate deeply into the second sheet. This problem in achieving controlled penetration depths is particularly serious when the material to be welded is aluminum sheet.

If deep penetration is not secured, the weld will be poor and the deficiency will show up as a lack of strength under shearing stresses. But inasmuch as aluminum is an excellent heat conductor, when an attempt is made to weld deeply enough into the bottom sheet to achieve the necessary shear strength, the bottom sheet often overheats and becomes molten.

One of the unique advantages enjoyed by the conventional sigma welding process is that no back-up is required. However, in working on aluminum, when a point on the bottom aluminum sheet overheats and becomes molten, the lack of a back-up allows the metal to drop through, thus destroying the weld.

It is therefore the primary object of this invention to allow the use of Sigma spot welding on aluminum sheet and produce high shear strengths for the welds.

Further objects of this invention are to achieve more uniformity in the strength of Sigma spot welds in aluminum sheets, to make possible deeper penetration spot welds of aluminum sheet than has been heretofore possible, and to prevent the weld puddle from dropping through the bottom sheet when spot welding aluminum. According to the present invention these objects are accomplished by backing the Sigma spot weld with a non-metallic, heat resisting material substantially covering and supporting the underside of the welding area. Preferably the backing material is self-adhesive, woven, and substantially free of gas evolving substances, such for example as a glass cloth tape.

In the drawings:

FIGURE 1 is a vertical section through a workpiece showing the practice of the invention including the welding arc and a self-adhesive supporting tape;

FIGURE 2 is a detail perspective view of the self-adhesive supporting tape used in FIGURE 1;

FIGURE 3 is an end elevation showing as a modification the use of an uncoated tape;

FIGURE 4 is a plan of the top surface of a weld formed by the process of the invention; and FIGURE 5 is an inverted plan of the bottom surface of the spot weld shown in FIGURE 4.

Referring to FIGURE 1 of the drawing, aluminum sheets 10 and 12 are shown in position to be welded together by spot welding. An arc is struck between the electrode wire 14 of a conventional Sigma torch 16 and the top sheet 10 and penetrates through the bottom sheet 12. In order to accomplish the objects of the present invention, a self-adhesive backing strip of glass or silica tape 18 is so positioned as to support the molten metal created by the action of the Sigma welding torch 16.

As shown in FIGURE 2, the tape 18 is provided with adhesive coating 20, and it is desirable to limit the coating to the outer portions of the tape. The cloth tape used for weld backing cannot have adhesive over its entire surface as the use of such a tape or any gas-tight backing will cause the weld puddle to solidify with a hollow space in the bottom of the deposit, possibly due to gas formation. In the preferred form of our invention, a glass tape is used with a heat resistant silicon adhesive over the outer third of its width. Single pieces 1 to 1.5 inches long are used to back each weld. Two layers of the tape are used in most tests since the additional mechanical reinforcement is required. Glass cloth tape backing would not be advantageous on bottom sheets over 3/16 inch thick since the high currents necessary for strength on this thickness produce an arc with enough force to penetrate the tape.

In the modification shown in FIGURE 3, the aluminum sheets 10 and 12 have been prepared for welding with a backing consisting of an uncoated glass or silica cloth tape 22 held in place by strips of glass or silica cloth tape 24 that are fully coated with heat resistant adhesive.

The particular silica cloth tape 22 used is "Refrasil" type, a product of the H.I. Thompson Fiber Glass Co. "Refrasil" material has greater high-temperature strength than glass cloth and its use permits larger weld deposits and high strength. "Refrasil" cloth is not coated with adhesive and is held in place by glass cloth tape 24 that is fully coated with heat resistant adhesive.

As indicated in FIGURES 4 and 5, the weld completely penetrates both the top and bottom sheets, resulting in a good weld surface at the underside of the bottom sheet without loss of metal and a consequent high weld strength.

It is understood, of course, that a number of modifications may be made in the manner of practicing the invention without departing therefrom. For example, a narrow silica cloth tape could be rolled with a wider, adhesive coated glass tape to facilitate application of the silica material. Tape could be applied in separate pieces for each weld or in continuous strips for a row of welds. Also, any type of non-metallic material having sufficient mechanical strength and heat resistivity may be employed in place of glass or silica cloth.

The results of two tests joining 3/32-in. to 3/32-in. sheets of 6061–T6 aluminum alloy are included in Table 1. In test No. 1, the sheets were wire brushed to remove the oxide coating and no backing was used. In test No. 2 silica cloth tape backing was used. For both tests argon shielding gas and 5356 aluminum alloy welding wire were used.

TABLE I

| Test 1 | | Test 2 | |
|---|---|---|---|
| Ultimate Shear (lbs.) | Variation from Average Shear (%) | Ultimate Shear (lbs.) | Variation from Average Shear (%) |
| 465 | +21 | 1,060 | −7 |
| 450 | +17 | 1,080 | −5 |
| 415 | +8 | 1,180 | +4 |
| 490 | +27 | 1,040 | −8 |
| 370 | −4 | 1,000 | −12 |
| 430 | +12 | 1,110 | −2 |
| 390 | +1 | 1,070 | −6 |
| 290 | −25 | 1,490 | +31 |
| 500 | +30 | 1,260 | +11 |
| 100 | −74 | 1,060 | −7 |
| 360 | −7 | | |
| 360 | −7 | [1] 1,135 | |
| [1] 385 | | | |

[1] Average.

The average strength of the samples backed with silica cloth tape is seen to be almost three times that of the wire brushed, unbacked samples. Also, variation in strength with silica cloth tape backing is considerably less than with unbacked material.

Table II summarizes the results of shear strength tests of spot welds on aluminum sheet. Each test comprised about ten samples. Argon shielding gas, sheets of 6061–T6 alloy, and 5356 aluminum alloy wire were used for all tests. The strength of glass tape-back joints of 1/16-in. sheet is seen to be higher than that for .083 in. joints. This is because the thinner sheet can take advantage of the characteristic weld penetration shape which is considerably wider near the top.

TABLE II

*Summary of shear strength tests*

| Sheet Thickness, in. | Backing | Current, amps. | Voltage, volts | Variation in Ultimate Shear (lbs., percent) | | |
|---|---|---|---|---|---|---|
| | | | | low | average | high |
| 1/16 to 1/16 | none | 250 | 22 | 110 −64% | 336 | 490 |
| | glass tape | 240 | 23 | 830 −17% | 1,005 | 1,160 +16% |
| .083 to .083 | none | 260 | 23 | 250 −41% | 426 | 590 +39% |
| | glass tape | 260 | 23 | 620 −30% | 880 | 1,370 +56% |
| 3/32 to 3/32 | none | 280 | 23 | 310 −38% | 498 | 670 +35% |
| | silica tape | 300 | 22 | 1,000 −12% | 1,135 | 1,490 +31% |
| 1/8 to 1/8 | do | 300 | 23 | 1,420 −11% | 1,600 | 1,880 +17% |
| 1/16 to 1/8 | glass tape | 250 | 23 | 1,040 −23% | 1,347 | 1,630 +21% |
| 3/32 to 1/8 | do | 285 | 23 | 920 −28% | 1,284 | 1,520 +19% |
| 3/32 to 1/4 | none | 350 | 24 | 1,310 −20% | 1,640 | 1,860 +13% |

While the description of the invention has been directed primarily to an improved method of Sigma spot welding of aluminum it is to be understood that the invention is not so limited but is equally applicable for use in other methods of welding as well as in seam welding and with other metals than aluminum.

What is claimed is:

1. The method of spot welding metal plates which comprises arranging said plates in overlapping relation, one above the other, adhesively applying directly to the underside of the lower of said plates below the weld zone a single layer of a woven glass fiber tape, said tape being permeable to the flow of gas therethrough and free of adhesive in the zone of the weld, striking an arc between the top plate and a wire electrode to melt the top of said plate, advancing the wire toward the top plate at a speed no less than the burn off rate of said wire electrode to cause the weld to penetrate through the upper plate and into said lower plate whereby said glass tape alone supports the molten weld zone and prevents molten metal in the weld zone from dropping through the lower plate.

2. The method of spot welding aluminum plates by means of an inert gas shielded metal arc, which comprises arranging said plates in overlapping relation, one above the other, the lower of said aluminum plates having a thickness not exceeding 3/16 of an inch, applying to the underside of the lower of said plates below the weld zone a single layer of woven glass tape, said tape being substantially free of gas evolving substances but provided with an amount of adhesive material sufficient to sustain said tape in direct contact with said lower plate, the center of said tape under the weld zone being substantially free of adhesive and being permeable to the flow of gas therethrough, striking an arc between the top plate and a wire electrode to heat and melt said top plate in the weld zone immediately above said woven glass tape, advancing the wire toward the top plate at a speed no less than the burn off rate of said wire electrode to cause the weld to penetrate through said upper plate and into said lower plate whereby said glass tape supports the weld zone and prevents molten metal therein from dropping through the lower plate.

References Cited in the file of this patent

UNITED STATES PATENTS

| | | |
|---|---|---|
| 2,362,505 | Smith | Nov. 14, 1944 |
| 2,591,926 | Gibson et al. | Apr. 8, 1952 |
| 2,792,626 | Chyle | May 21, 1957 |
| 2,814,719 | Wilson | Nov. 26, 1957 |
| 2,819,517 | Pursell | Jan. 14, 1958 |
| 2,820,427 | Chyle et al. | July 21, 1958 |